Sept. 17, 1957   E. McDONALD   2,806,251
POWER ACTUATED, TIRE MOLD BODY OPENING AND CLOSING DEVICE
Filed April 21, 1955   2 Sheets-Sheet 1
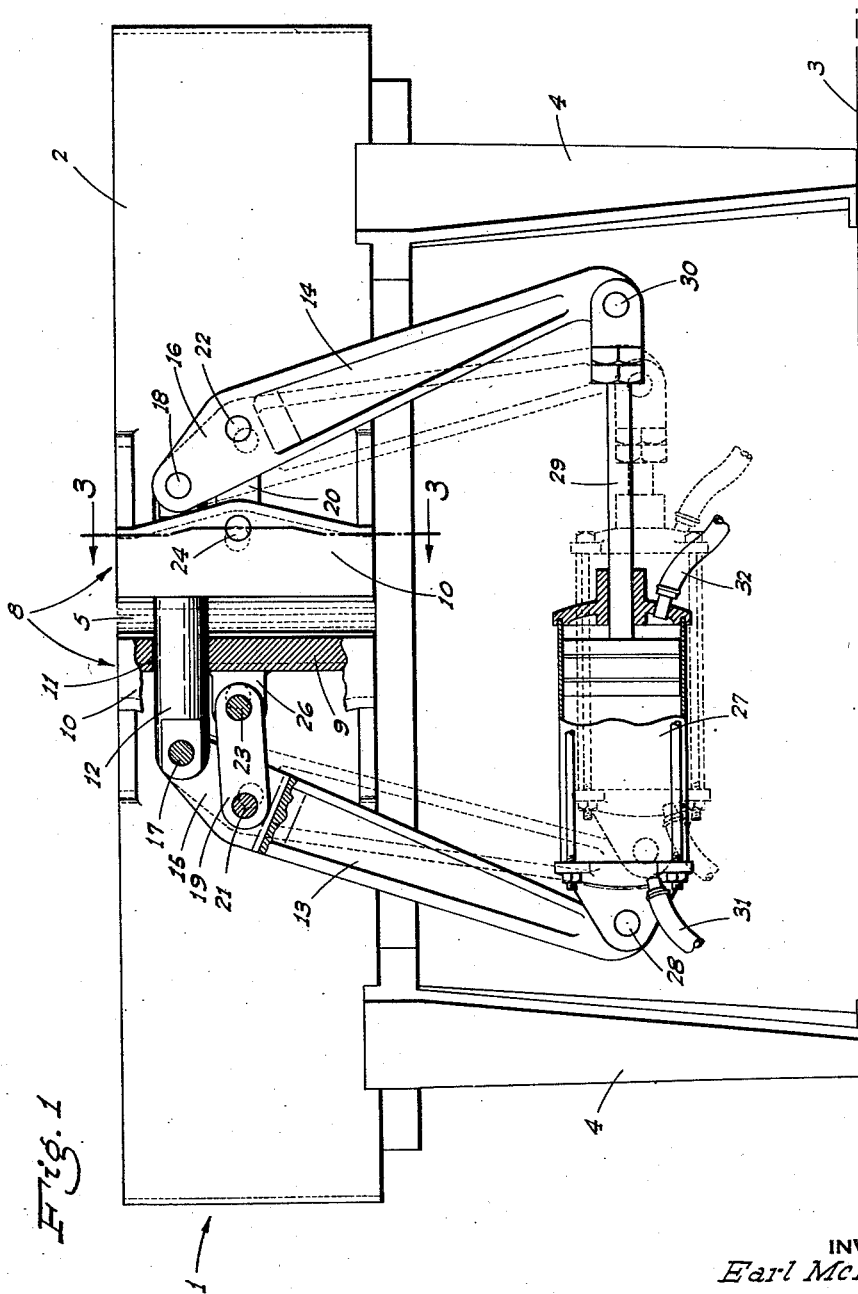
INVENTOR
Earl McDonald
BY Webster & Webster
ATTYS.

Sept. 17, 1957 E. McDONALD 2,806,251
POWER ACTUATED, TIRE MOLD BODY OPENING AND CLOSING DEVICE
Filed April 21, 1955 2 Sheets-Sheet 2
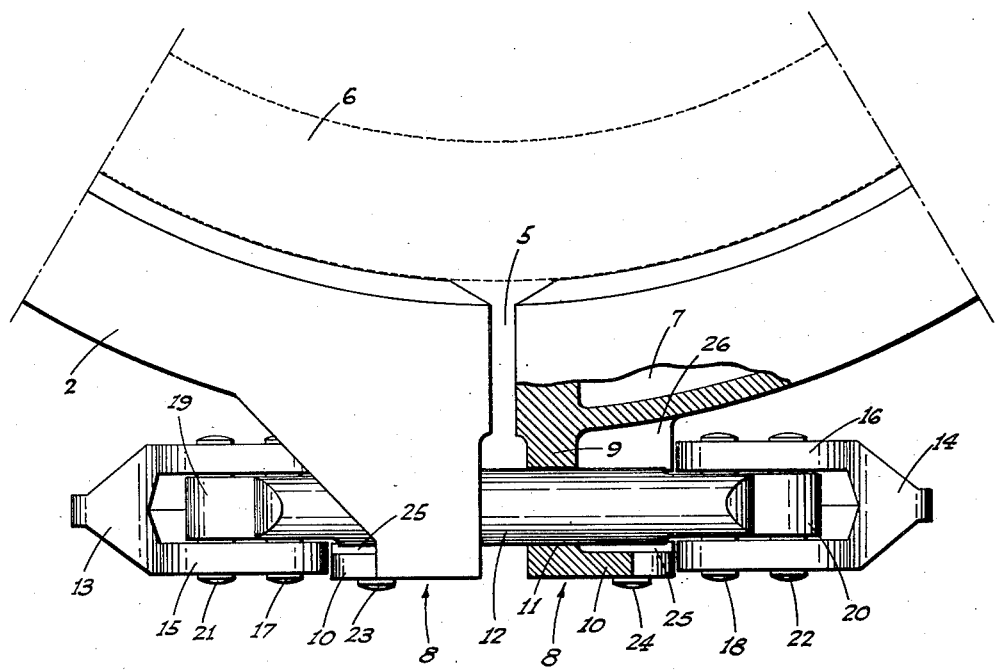
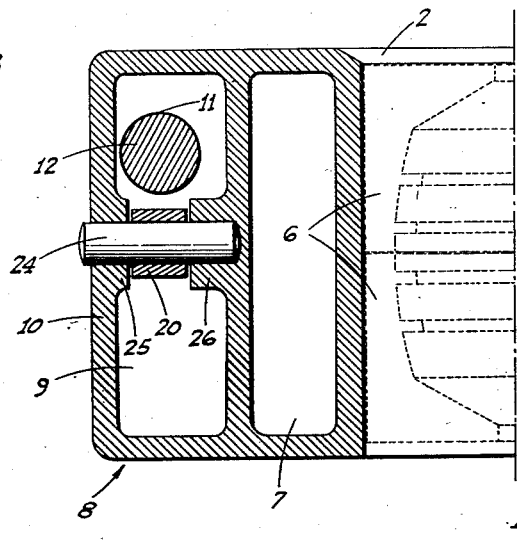
INVENTOR
Earl McDonald
BY Webster & Webster
ATTYS.

United States Patent Office 2,806,251
Patented Sept. 17, 1957

2,806,251

POWER ACTUATED, TIRE MOLD BODY OPENING AND CLOSING DEVICE

Earl McDonald, Stockton, Calif., assignor to Super Mold Corporation of California, Lodi, Calif., a corporation of California Application April 21, 1955, Serial No. 502,931

5 Claims. (Cl. 18—18)

This invention relates in general to an improvement in tire retreading or recapping molds; the invention being directed particularly to the type of mold which includes a one-piece annular body within which the tire tread vulcanizing matrix assembly is disposed for clamping engagement.

The annular body of the mold is radially split at one point in its circumference to provide a gap between the adjacent ends, and a device is connected between such ends to expand or contract the mold body whereby to increase its diameter to facilitate the insertion or removal of the matrix assembly, or to decrease the body diameter to clamp the matrix assembly in the body preparatory to a tire tread vulcanizing operation, selectively.

The major object of the present invention is to provide a novel device for so expanding or contracting the mold body; such device being connected to the mold body in spanning relation to the radial gap and being power actuated in a manner to accomplish quick and positive opening or closing of said mold body— i. e. to expand or contract the same.

Another important object of this invention is to provide a device—for the purpose described—which includes a novel lever and link assembly which is actuated through the medium of a fluid pressure power cylinder.

An additional object of the invention is to provide a device, of the type described, which is operative to impose equalized or uniform mold body expanding or contracting forces to the ends of the mold body adjacent the radial gap; this being especially desirable not only to assure of proper clamping of the matrix assembly in the mold body when it is contracted, but also to distribute the forces equally in the mold body—which is of cast metal, but capable of being sprung somewhat—from both ends.

It is also an object of the invention to provide a tire mold body opening and closing device which—in addition to its function to expand or contract the body—effectively maintains the ends thereof, adjacent the radial gap, in proper alinement at all times.

Still another object of the invention is to provide a practical, reliable, and durable tire mold body opening and closing device, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, partly broken away and partly in section, of the device as applied to a tire mold; the latter being shown in somewhat diagrammatic elevation.

Fig. 2 is an enlarged plan view, partly broken away, of the device as mounted in connection with adjacent ends of the mold body; the latter being shown only in part.

Fig. 3 is an enlarged transverse sectional elevation on line 3—3 of Fig. 1.

Referring now more particularly to the drawings, and to the characters of reference marked thereon, the tire mold, upon which the device is adapted for use, is shown generally at 1, and includes an annular mold body 2 supported from the floor 3 by legs 4.

The annular mold body 2 is radially split through at one point in its circumference in order to form a gap 5. Such mold body 2, while being of cast metal, is nevertheless capable of being sprung to somewhat increase or decrease its diameter, and which is permitted by reason of the existence of the radial gap 5.

The annular mold body 2 is adapted to receive the tire tread vulcanizing, annular, matrix halves or sections 6; the mold body when open or expanded permitting of ready and convenient placement or removal of the matrix sections by reason of the increase in effective internal diameter of said mold body. Contrariwise, when the mold body is closed or contracted it is tightly clamped about matrix sections 6, by reason of the reduction in the effective internal diameter of said mold body.

When the matrix sections are thus clamped in the mold body 2, they are heated—for the vulcanizing operation— by a steam chamber 7 formed in said mold body, as is conventional.

The device, which embodies the present invention, is for the purpose of so expanding or contracting the mold body 2; such device comprising the following:

The mold body 2 is formed, at the ends—i. e. adjacent the radial gap 5—with a pair of matching, laterally outwardly projecting brackets 8 which include heavy-duty webs 9 disposed in adjacent but spaced facing relation. Additionally, the brackets 8 include—on the outside—oppositely projecting flanges 10.

Adjacent but short of the top of the brackets 8, the webs 9 are formed with axially alined bores 11 through which a floating or slidably mounted shaft 12 projects; such shaft being of a length that its outer ends are disposed a distance from the related webs 9.

A pair of transversely spaced lever arms 13 and 14 are each formed at their upper ends with a fork, said forks being indicated at 15 and 16, respectively. The forks 15 and 16 straddle, and are pivotally connected to, the corresponding ends of the shaft 12 by transverse pivot pins 17 and 18.

Relatively short, push-pull links 19 and 20 are disposed below related end portions of the shaft 12, in adjacent but clearance relation; the links 19 and 20 extending at their outer ends into the forks 15 and 16, and being pivoted thereto by transverse pivot pins 21 and 22.

At their inner ends the links 19 and 20 are carried on transverse pivot pins 23 and 24, each of which extends between and is supported by alined bosses 25 and 26, formed respectively on the related flange 10 and an adjacent part of the corresponding end portion of the mold body 2.

As above mounted, the lever arms 13 and 14 depend in diverging relation from the annular mold body 2 at one side thereof, and in clearance relation, for power actuation by the following means:

A double-acting, fluid pressure power cylinder 27, preferably of pneumatic type, extends lengthwise between the lower ends of the lever arms 13 and 14; the cylinder 27—in the present embodiment—being connected at its outer end to the lower end of the lever arm 13 by a transverse pivot pin 28. The cylinder 27 includes a piston rod 29 which projects in the opposite direction, and said rod—at its outer end—is connected to the lower end of the lever arm 14 by a transverse pivot pin 30.

The power cylinder 27 is reversibly actuated by a valve-controlled, fluid pressure conduit system, shown here only in part at 31 and 32.

The above described device functions in the following manner:

When it is desired to open or expand the mold body 2 the cylinder 27 is caused to work in a direction to increase its effective length, as shown in full lines in Fig. 1, and which swings the lever arms 13 and 14 away from each other about the axis of the pivot pins 17 and 18.

When this occurs the links 19 and 20 are forcefully pulled in opposite directions or away from each other, which results in expansion of the mold body 2, whereby the matrix sections 6 can be freely placed in or removed from said body.

Contrariwise, when the power cylinder 27 is actuated to decrease its effective length, as shown in dotted lines in Fig. 1, the lever arms 13 and 14 are swung toward each other and the links 19 and 20 forcefully push inwardly; i. e., toward each other, causing contraction of the annular mold body 2 and positively clamping the matrix sections 6 therein.

In order to maintain a balance or equalization of the forces applied by the described lever and link assemblies to the mold body 2 on opposite sides of the radial gap 5, the shaft 12 is mounted for lengthwise floating or sliding movement through the webs 9, as hereinbefore described.

Additionally, the shaft 12 maintains the adjacent ends of the mold body 2 in proper alinement at all times.

Further, the power cylinder 27, when extended or contracted in its effective length, can be maintained in such position to thereby hold the mold body expanded or contracted respectively; the holding of the mold body contracted being necessary to clamp the matrix sections 6 in said body during a tire tread vulcanizing operation.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A device for expanding or contracting a springable, annular, tire mold body having a transverse split therethrough; comprising rigid brackets projecting from the body portions on opposite sides of the split, levers positioned on opposite sides of the brackets and extending in the same direction therefrom, links pivotally connected between the levers intermediate their ends and corresponding brackets, the links extending generally at right angles to the brackets, a selectively extensible and contractible power unit connected between the levers at points thereon remote from the links, and a shaft extending lengthwise in spanning relation to the split and slidably projecting through the brackets to end terminations therebeyond; said shaft at its ends being pivoted to the levers adjacent the links.

2. In an annular resilient tire-mold body formed with a transverse split, a device to expand and contract the body to open and close the split comprising a pair of levers disposed on opposite sides of the split in opposed relation and lying in a plane substantially parallel to the axis of the mold, means pivotally connecting the levers intermediate their ends on the body adjacent the corresponding sides of the split, a double-acting power unit connecting the levers at one end, a rigid member connecting the levers at the other end and preventing separation of such other ends from each other, and means supporting said member from the body and so that the levers are also supported from the body.

3. A device, as in claim 2, in which said connecting means comprises relatively short links.

4. In an annular resilient tire-mold body formed with a transverse split, brackets on and projecting radially out from the body on opposite sides of the split, a pair of levers on opposite sides of the brackets and disposed in a plane substantially parallel to the axis of the body, means flexibly connecting the levers at points relatively close to one end thereof to the brackets intermediate the ends thereof, a device connected to and extending between the other ends of the levers to selectively separate or bring such ends toward each other, and a rigid shaft connecting the levers together at said one end, said shaft being supported by the brackets and extending transversely thereof and on which one of the brackets is relatively slidable.

5. In an annular resilient tire-mold body formed with a transverse split, a device to expand and contract the body to open and close the split comprising a pair of opposed levers, a double acting power unit connecting the levers at one end, and means mounting the levers on opposite sides of the split and so as to lie in a plane substantially parallel to the axis of the body and in depending and adjacent relation thereto with said one end lowermost; said means comprising means pivotally connecting the levers intermediate their ends to the body, and a member pivotally connecting the levers at their other end against separation of the levers from each other at such end; the axis of the pivotal connections being parallel to a line radially of the body in the zone of the split.

References Cited in the file of this patent

UNITED STATES PATENTS

| | | |
|---|---|---|
| 2,067,626 | Benninghoff | Jan. 12, 1937 |
| 2,255,770 | Glynn | Sept. 16, 1941 |
| 2,370,655 | Glynn | Mar. 6, 1945 |
| 2,638,629 | Heintz | May 19, 1953 |
| 2,707,876 | McConnell et al. | May 10, 1955 |
| 2,706,321 | Herr | Apr. 19, 1955 |
| 2,730,764 | James | Jan. 17, 1956 |